(12) United States Patent
Fukuda

(10) Patent No.: US 6,816,704 B1
(45) Date of Patent: Nov. 9, 2004

(54) COMMUNICATION METHOD, RADIO BASE STATION APPARATUS AND RADIO TERMINAL APPARATUS

(75) Inventor: Kunio Fukuda, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/237,924

(22) Filed: Jan. 27, 1999

(30) Foreign Application Priority Data

Jan. 30, 1998 (JP) .......................................... P10-020020

(51) Int. Cl.⁷ ................................................ H04B 7/14
(52) U.S. Cl. .......................... 455/7; 455/140; 455/426.1
(58) Field of Search ............................. 455/20, 22, 23, 455/556–558, 517, 66, 426, 13.3, 11.1, 140, 500, 7, 13.1, 15, 16, 454, 426.1, 526, 132, 133, 136; 709/219, 328, 329

(56) References Cited

U.S. PATENT DOCUMENTS

| | | | |
|---|---|---|---|
| 5,379,451 A | | 1/1995 | Nakagoshi et al. ......... 455/456 |
| 5,483,662 A | * | 1/1996 | Nonoyama et al. ........ 455/12.1 |
| 5,515,419 A | | 5/1996 | Sheffer ....................... 455/456 |
| 5,590,346 A | * | 12/1996 | West et al. ................. 455/348 |
| 5,694,120 A | * | 12/1997 | Indekeu et al. ............ 455/38.1 |
| 5,752,186 A | | 5/1998 | Malackowski et al. ..... 455/414 |
| 5,793,762 A | * | 8/1998 | Penners et al. ............. 455/439 |
| 5,886,647 A | * | 3/1999 | Badger et al. ............. 455/38.2 |
| 5,926,116 A | * | 7/1999 | Kitano et al. ............... 340/988 |
| 6,088,594 A | * | 7/2000 | Kingdon et al. ............ 455/457 |
| 6,119,167 A | * | 9/2000 | Boyle et al. ................ 709/234 |
| 6,148,405 A | * | 11/2000 | Liao et al. .................. 713/201 |
| 6,247,048 B1 | * | 6/2001 | Greer et al. ................ 709/219 |

FOREIGN PATENT DOCUMENTS

JP 4347938 3/1992

* cited by examiner

Primary Examiner—David Hudspeth
Assistant Examiner—Eliseo Ramos-Feliciano
(74) Attorney, Agent, or Firm—Jay H. Maioli

(57) ABSTRACT

By receiving and demodulating at least one designated signal out of a plurality of broadcasting signals transmitted in respectively different formats or communication signals and by converting the demodulated received signal into a predetermined radio transmission format for radio transmission, relay-transmission of at least one signal out of the plurality of the broadcasting signals or communication signals is carried out to a communication terminal corresponding to the radio transmission format. Thus, it is possible for a movable terminal to carry out favorable reception of various kinds of data such as a digital broadcast, an Internet broadcast or the like.

6 Claims, 13 Drawing Sheets

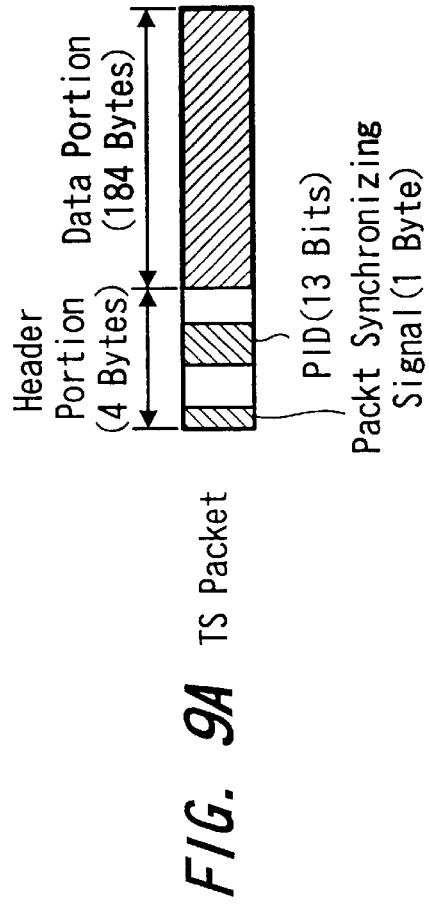
FIG. 9A TS Packet
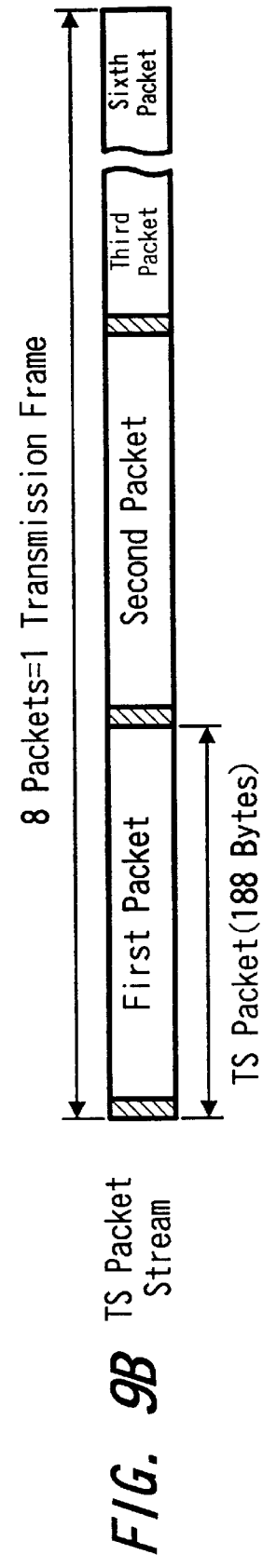
FIG. 9B TS Packet Stream

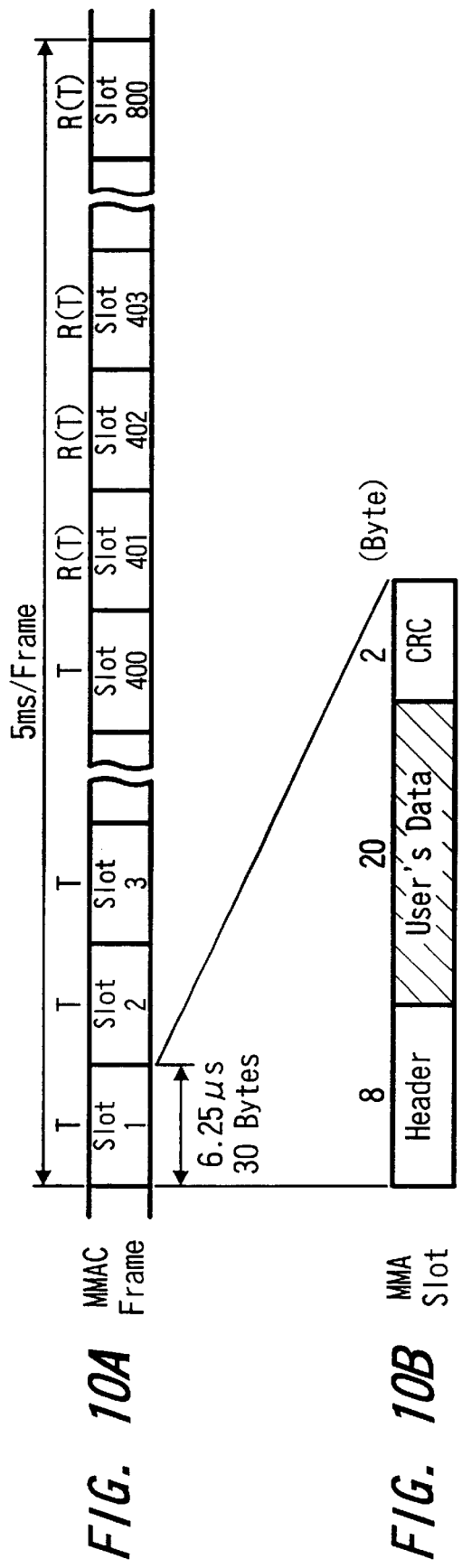
FIG. 10A MMAC Frame
FIG. 10B MMA Slot

COMMUNICATION METHOD, RADIO BASE STATION APPARATUS AND RADIO TERMINAL APPARATUS

BACKGROUND OF THE INVENTION

1. Field of the Invention

The present invention relates to a communication system suited for being applied to a case of, for example, receiving various kinds of broadcasting signals such as a digital satellite broadcasting, a digital ground broadcasting and so on or equivalent communication signals.

2. Description of the Related Art

In the past, the transmission side of a digital broadcast for carrying out a television broadcast, a radio broadcast and the like by transmission of digital data has been carried out by an arrangement shown in FIG. 1. Here, a broadcasting center 1 has such an arrangement to carry out both transmission of a digital satellite broadcast and transmission of a digital ground wave broadcast, and carries out coding processes of respectively corresponding data of a video source 1a supplied by a contents provider and the like in a video coding unit 1c, an audio coding unit 1d, an accessory data unit 1e in a source coding unit 1b and multiplexing process of respectively coded data in a multiplexing unit if. Here, as for the coding process, video data and audio data are subjected to a coding process by, for example, a MPEG-2 system (one of standardized coding systems of moving images) (concretely, for example, video data by a process prescribed by MPEG-VIDEO ISO/IEC 13818-2 and audio data by a process prescribed by MPEG-2 AUDIO ISO/IEC 13818-3 or the like) and as for an accessory data, arbitrary coding is carried out. The multiplexing process in the multiplexing unit if is carried out in accordance with a predetermined system, for example, MPEG-2 System (ISO/IEC 13818-3). When subjected to the MPEG-2 System, the data is converted into a transport stream (hereafter, referred to as a TS) of this MPEG-2 System. The following explanation will be made on condition that the data is processed by this MPEG-2 System.

The coded signal (TS) in the source coding unit 1b is supplied to a channel coding unit 1g to be converted into a signal format to be practically transmitted. That is, a scramble process is carried out for energy diffusion in a scramble processing unit 1h, and in an error correcting coding unit 1i, generating and adding of an error correcting code are carried out. As for the error correcting coding here, a continuous code combining a blockcode as an outside signal and a convolution signal as an inside code are used. As the outside signal, for example, a lead solomon code and as the inside code, for example, a punctured code with a variable coding ratio are used. After the error correcting coding process is carried out, an interleave process is carried out in an interleave unit 1j.

Then, in a case of a ground wave broadcast, a modulating process of an output from the channel coding unit 1g is carried out by an OFDM system (Orthogonal Frequency Division Multiplex system) in an OFDM modulating unit 1k and a conversion process of its modulated signal as a radio signal with a predetermined transmission band area is carried out in a RF conversion unit in and radio transmission is carried out from a ground wave antenna 2. Also, in a case of a satellite broadcast, a modulating process of an output from the channel coding unit 1g is carried out in a QPSK modulating unit lm with a QPSK system (Quarternary Phase-Shift keying System) and a conversion process of its modulated signal as a radio signal with a predetermined transmission band is carried out in a RF modulating unit 1o and radio transmission is carried out toward a broadcasting satellite (or a communication satellite) by a satellite antenna 3.

Then, as an arrangement on the reception side of a digital broadcasting signal transmitted with this arrangement, there is used a conventional arrangement as shown in FIG. 2. A ground wave reception antenna 4 and a satellite reception antenna 7 for receiving a broadcasting wave from a broadcasting satellite 6 are connected to a set-top box 5 which carries out a reception processing for a broadcasting signal and the ground wave reception antenna 4 is connected to a ground wave tuner 5a, and a signal received by the tuner 5a is demodulated in an OFDM demodulation unit 5b to obtain reception data. Also, the satellite reception antenna 7 is connected to a satellite tuner 5c and a signal received in this tuner 5c is demodulated in a QPSK demodulation unit 5d to obtain reception data.

Digital broadcasting data demodulated at respective demodulating units 5b and 5d are subjected to a deinterleave process in a deinterleave unit 5e, an error correcting process in an error correcting unit 5f and a descrambling process in a descramble unit 5g, whereby the original TS is restored. Then, video data and audio data with MPEG-2 system are subjected to a separation process in a multiplex separation unit 5h and decoded in a MPEG 2 decoder 5i. The video data decoded in the decoder 5i is made to be a video signal of NTSC system in an NTSC encoder 5j and the audio data decoded in the decoder 5i is made to be an analog audio signal in a digital/analog converter 5k, and these video signal and audio signal are supplied to and received by a monitor receiver 8 (or an ordinary television receiver) connected to the set top box 5.

By connecting an apparatus called the set top box to a receiver in this manner, it becomes possible to watch the digital broadcast by a receiver corresponding to an analog ground wave.

Here, the arrangement has been shown of transmission and reception of the digital broadcast by the ground broadcasting wave and the satellite broadcasting wave, but in a case of a cable television (so-called CATV), the arrangement is the same until the channel coding on the transmission side and is different only in that a particular arrangement is used in the modulation process and the RF conversion process.

On the other hand, as an entirely different system from a watching system for the television broadcast, what they call a multimedia mobile access system (MMAC: Multimedia Mobile Access System) has been proposed. This access system is a high speed radio access system capable of being seamlessly connected to an optical fiber network (BISDN), in which a comparatively high frequency band such as 5 GHz and the like is used as a frequency band, a transmission rate is about 30 Mbps and a TDMA/TDD system (time division multiple access system) is used as an access system. FIG. 3 is a diagram showing an overall arrangement of this multimedia mobile access system and here is an arrangement in a case of carrying out a service called an IP (Internet Protocol) access connected to an Internet network, and which comprises a various kinds of contents server 11 connected to an Internet network 12 and an MMAC base station 15 where communication is carried out through an ISDN (or general telephone line) 13 or an optical fiber network 14. This base station 15 is connected to the ISDN 13 or the optical fiber network 14 by a user network interface (UNI).

The MMAC base station 15 carries out a radio communication with a portable information terminal 16 according to the above-mentioned transmission system and a relay between circuits 13 and 14 connected to the base station 15 and the terminal 16.

FIG. 4 shows an arrangement of the MMAC base station which has conventionally been proposed, and here is an example of a case when the optical fiber network 14, where communication is carried out by an asynchronous transfer mode (Asynchronous Transfer Mode: hereafter, referred to as an ATM), is connected. In the base station 15, an interface unit 15a which carries out a user network interface with data (ATM cell) transmitted in terms of the ATM is connected to the optical fiber network 14 to carry out multiplexing of the ATM cell. In an ATM network circuit control unit 15b connected to an interface unit 15a, circuit control such as a call access and the like on the network is carried out. In an ATM cell diassembly/assembly unit 15c connected to the ATM network circuit control unit 15b, diassembling of the ATM cell from the network side and assembling of the ATM cell transmitted to the network side are carried out.

Received data from the network side, which is diassembled in the ATM cell diassembly/assembly unit 15c is sent to a MMAC channel coding/decoding unit 15d to be converted into a MMAC radio transmission format, and after this converted data is subjected to a modulation process by way of the QPSK modulation or the like in a modulation unit 15g, transmission processes such as frequency conversion, amplification and the like are A carried out in a transmission unit 15h and radio transmission from an antenna 15i to a terminal is carried out.

Also, a signal transmitted from the terminal side is such that, after being subjected to a reception process such as frequency conversion and the like in a reception unit 15j connected to the antenna 15i, demodulation of received data is carried out in a demodulation unit 15k, and the demodulated received data is supplied to the MMAC channel coding/decoding unit 15d for a decoding process. Then, the decoded data is assembled as an ATM cell in the ATM cell diassembly/assembly unit 15c and transmitted from the interface unit 15a to the optical fiber network 14 connected under control of the ATM network circuit control unit 15b.

Also, these processes in the MMAC base station 15 are, carried out under control of a central control unit (CPU) 15e through a bus line 15f.

In the portable information terminal 16 which is a MMAC terminal, as shown in FIG. 5, after reception processes such as frequency conversion and the like are carried out in a reception unit 16b connected to an antenna 16a, demodulation of the received data is carried out in a demodulation unit 16c, the demodulated received data is supplied to an MMAC channel coding/decoding unit 16d to carry out a conversion process from a radio transmission format of the MMAC. This converted data is, after being supplied to a central control unit (CPU) 16g of the terminal 16, separated into video data and audio data, which are supplied to a digital signal process unit (DSP) 16k to be subjected to a decode process based on the MPEG-2 system. After the video data is processed for a display, it is supplied to a liquid driver 16i and a video is displayed on a liquid display 16j based on control of the central control unit 16g. Also, the audio data included in the received data is converted into an analog audio signal in the digital signal process unit 16k and is outputted from a speaker 16m.

Also, transmission data generated based on operation by an operation unit 16h connected to the central control unit 16g is supplied to the MMAC channel coding/decoding unit 16d to be converted into the radio transmission format of the MMAC, and after this converted data is subjected to a modulation process by way of the QPSK modulation or the like in a data modulation unit 16e, the modulated data is subjected to transmission processes such as frequency conversion, amplification and the like in a transmission unit 16f and radio-transmitted from the antenna 16a to the base station.

By preparing a base station and a terminal unit with such a MMAC system and being connected with the Internet network or the like, it is possible to receive an Internet broadcast from the various kinds of contents server or the like by the terminal unit 16. In this case, in a case of the MMAC system, because a high speed radio access is possible, it is possible to have the terminal unit receive and display moving video data and the like.

By the way, the MMAC system terminal unit can carry out the reception and transmission as it moves as long as it is within a range where a signal from the base station can reach as well as it can be made to receive and display the Internet broadcast or the like at an arbitrary place, but, it has been difficult to incorporate a digital broadcast receiving system shown in FIG. 2 in the MMAC terminal unit.

That is, as for an antenna for receiving a digital broadcast, particularly, a digital satellite broadcast, there is a need for an antenna having a high-gain as well as high directivity and further, because there is a need that a beam is oriented toward a constant direction, it is difficult for the portable terminal to carry out reception. Also, there is a limit to miniaturizing a receiving process apparatus for the digital broadcast called the set top box 5 shown in FIG. 2, thereby making it impossible to install it in the portable terminal. Particularly, in a case of an apparatus for carrying out reception from both the satellite broadcast and the ground wave broadcast as shown in FIG. 2, a circuit becomes necessary to carry out receiving process of each of the signals, thereby posing a cause for hampering the miniaturization and low cost of the terminal unit. Also, as a matter of course, it has been impossible for a mobile terminal to receive a digital broadcast transmitted by cable television.

Also, it may be conceivable that the Internet broadcast and large capacity contents are Internet-accessed and distributed by mobile communication according to the MMAC system but, for many users to try a simultaneous access, there has been a need for a network backbone with high speed and wide band as well as an enormous burden on the part of servers, with a result that there has been a limit to distributing high speed and large capacity data only with the present ground-system network.

SUMMARY OF THE INVENTION

In view of such points, an object of the present invention is to carry out satisfactory reception of various kinds of data such as the digital broadcast, the Internet broadcast and the like by a mobile terminal.

According to a first aspect of the present invention, there is provided communication system, which comprises a relay apparatus having a receiving unit having a plurality of receives for receiving communication signals communicated by a plurality of different communication systems, a control unit for selecting one of said plurality of receivers based on a request signal, a converting means for converting a communication signal, which is received by a receiver selected by said control unit, into a radio signal corresponding to a specific radio transmission format, and a radio transmission unit for transmitting said radio signal; and a terminal apparatus having a receiving means for receiving a radio signal corresponding to said specific radio transmission format.

According to a second aspect of the present invention, there is provided a relay apparatus in communication system, which comprises a receiving unit having a plurality of receivers for receiving communication signals communicated by a plurality of different communication systems;

a control unit for selecting one of said plurality of receivers based on a request signal;

a converting means for converting a communication signal, which is received by a receiver selected by said control unit, into a radio signal corresponding to a specific radio transmission format; and a radio transmission unit for transmitting said radio signal to a terminal apparatus corresponding to said specific radio transmission format.

According to a third aspect of the present invention, there is provided a terminal apparatus capable of communicating with a relay apparatus having a receiving unit having a plurality of receivers for receiving communication signals communicated by a plurality of different communication systems, a control unit for selecting one of said plurality of receivers based on a request signal, a converting means for converting a communication signal, which is received by a receiver selected by said control unit, into a radio signal corresponding to a specific radio transmission format, and a radio transmission unit for transmitting said radio signal, which comprises a request signal generating means for generating said request signal; and a request signal transmission means for transmitting said request signal; and a receiving means for receiving a radio signal corresponding to said specific radio transmission format.

BRIEF DESCRIPTION OF THE DRAWINGS

FIGS. 9A and 9B are each an explanatory diagram showing a packet arrangement transmitted in the first embodiment of the present invention;

FIGS. 10A and 10B are each an explanatory diagram showing a frame arrangement of a radio transmission format according to the first embodiment of the present invention;

DESCRIPTION OF THE PREFERRED EMBODIMENTS

Hereafter, a first embodiment of the present invention will be explained with reference to FIG. 6 through FIG. 12.

This example, in a multimedia mobile access system hereafter, referred to as a MMAC) for carrying out a radio communication between a base station and a terminal apparatus, makes it possible to handle various kinds of broadcasting signals or communication signals, and as to a fundamental system of the MMAC, has the same system as that of the MMAC explained in the prior art example. That is, as a frequency band, a comparatively high frequency band such as 5 GHz and the like is used and a transmission rate is about 30 bps, and as to an access system, a TDMA/TDD system (time division multiple access system) is used.

Figure 1:
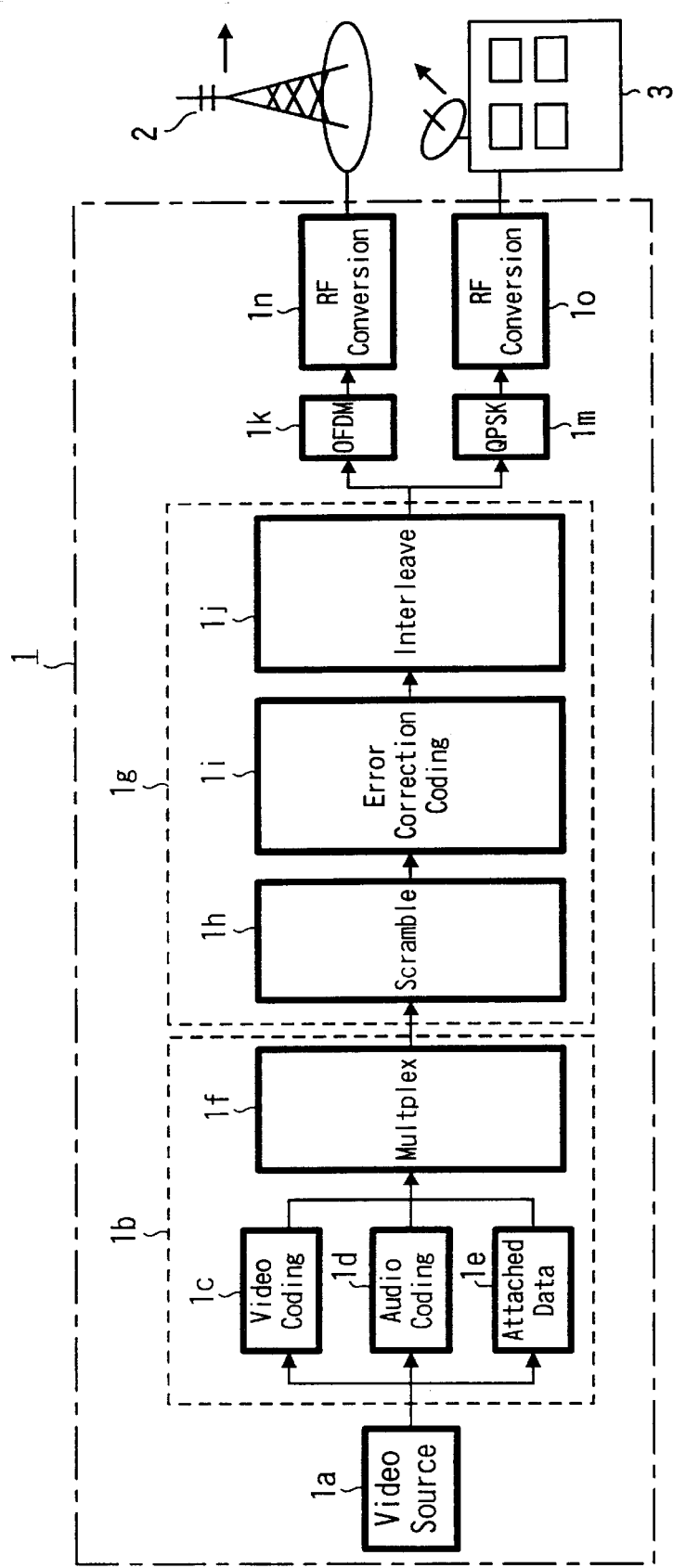
FIG. 1 is a block diagram showing an arrangement on the transmission side of a conventional digital broadcast.
Figure 2:
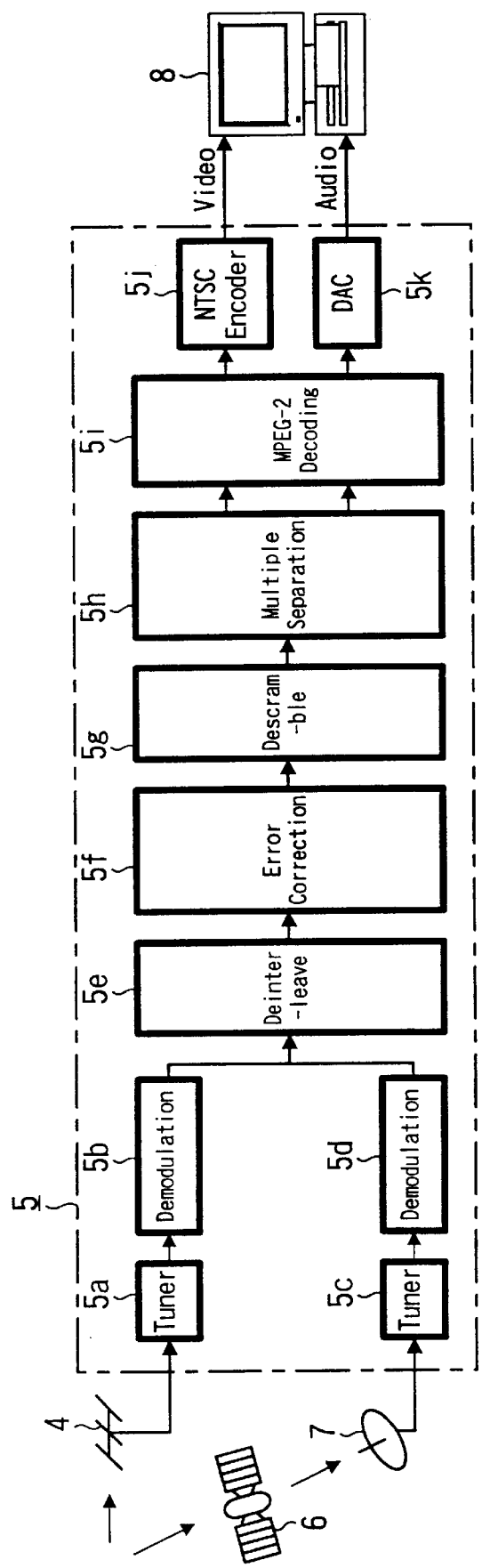
FIG. 2 is a block diagram showing an arrangement on a receiving side of the conventional digital broadcast.
Figure 3:
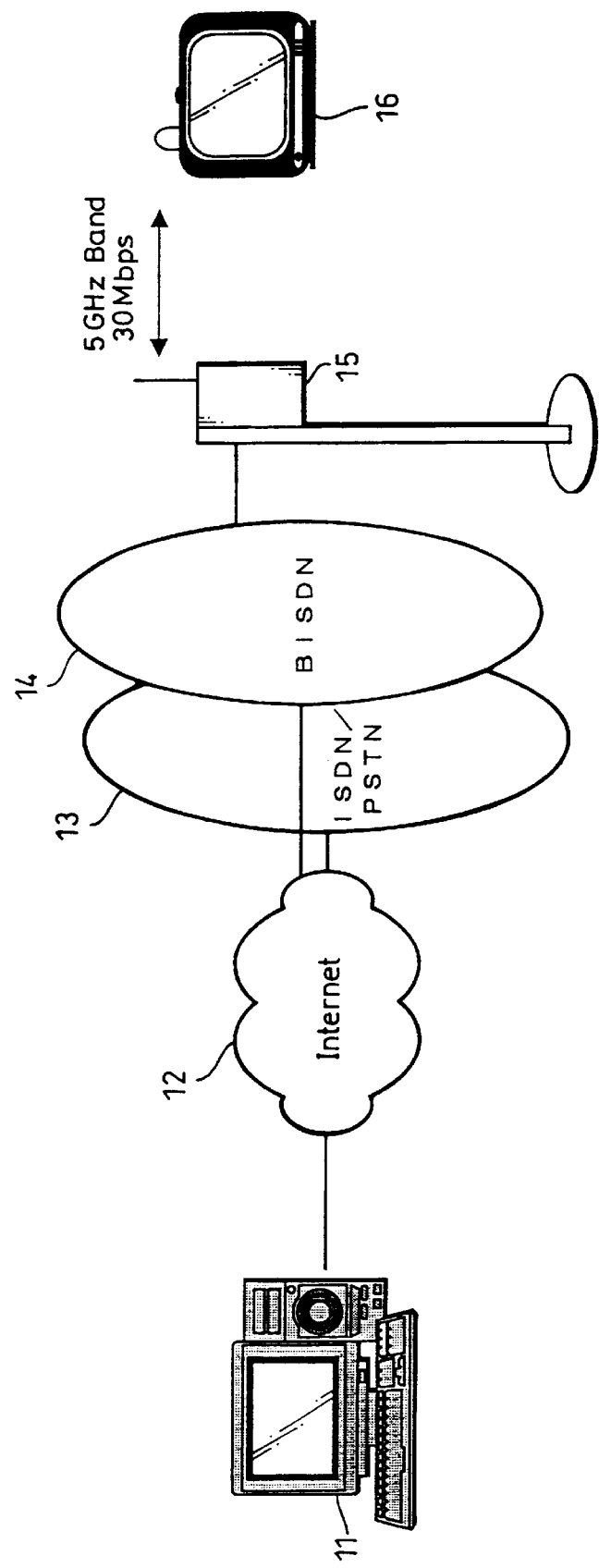
FIG. 3 is a diagram showing a conventional multimedia mobile access system.
Figure 4:
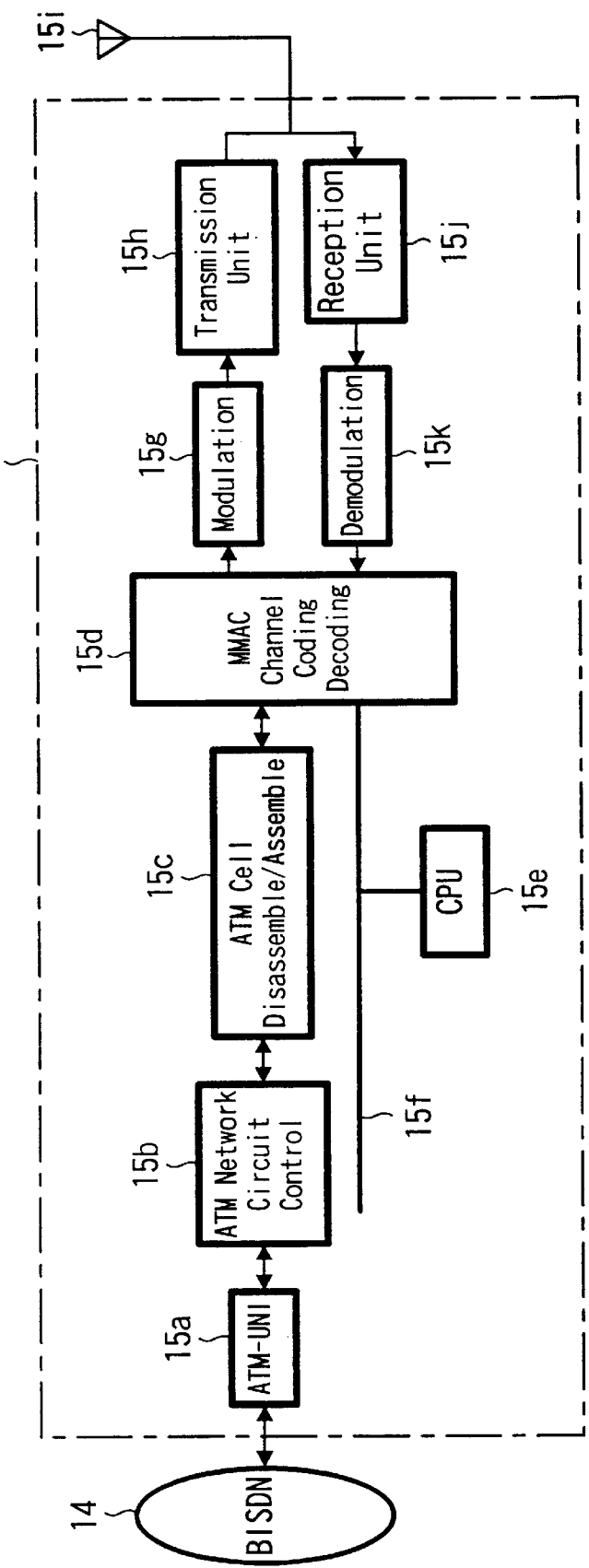
FIG. 4 is a block diagram showing an arrangement of a conventional MMAC base station.
Figure 5:
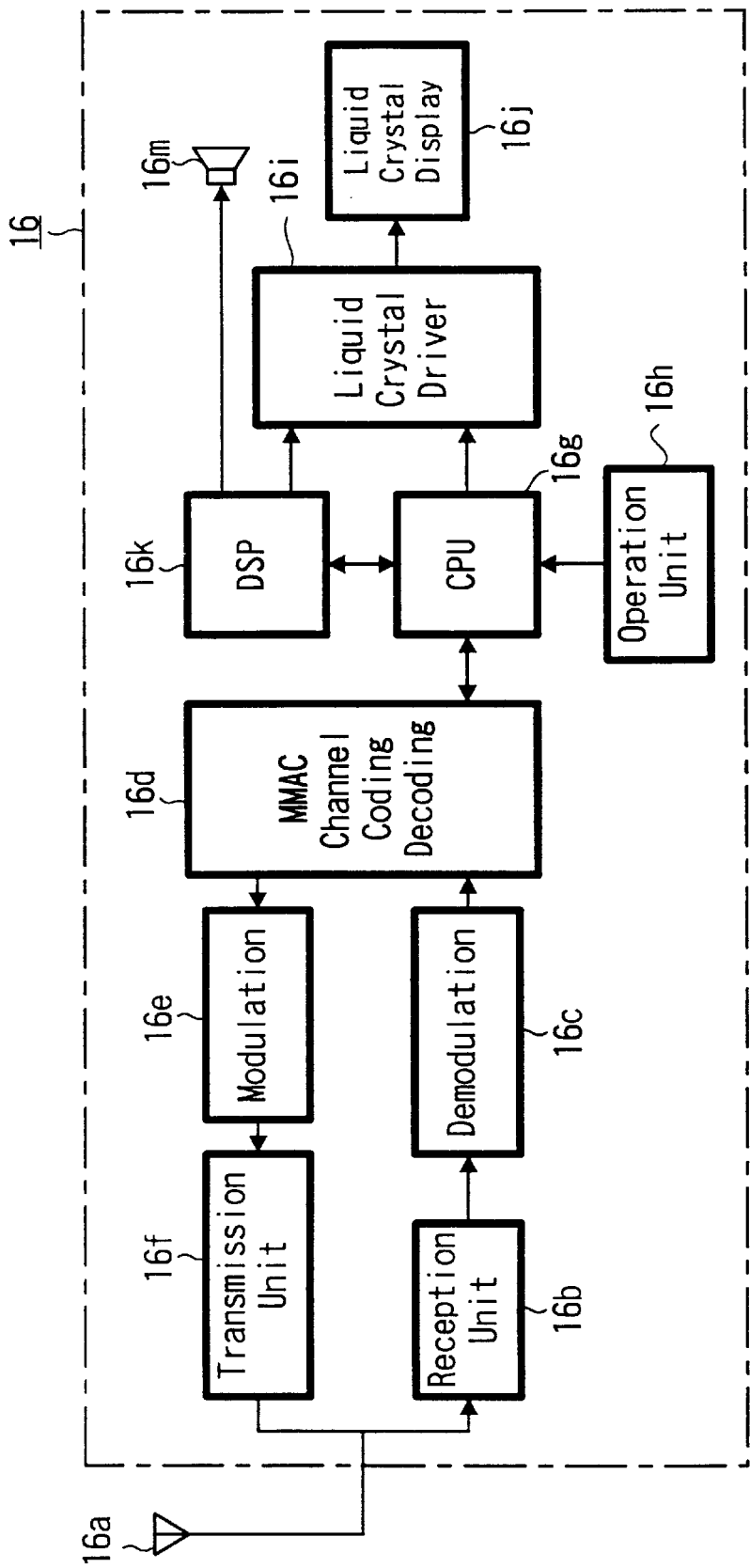
FIG. 5 is a block diagram showing an arrangement of a conventional MMAC terminal apparatus.
Figure 6:
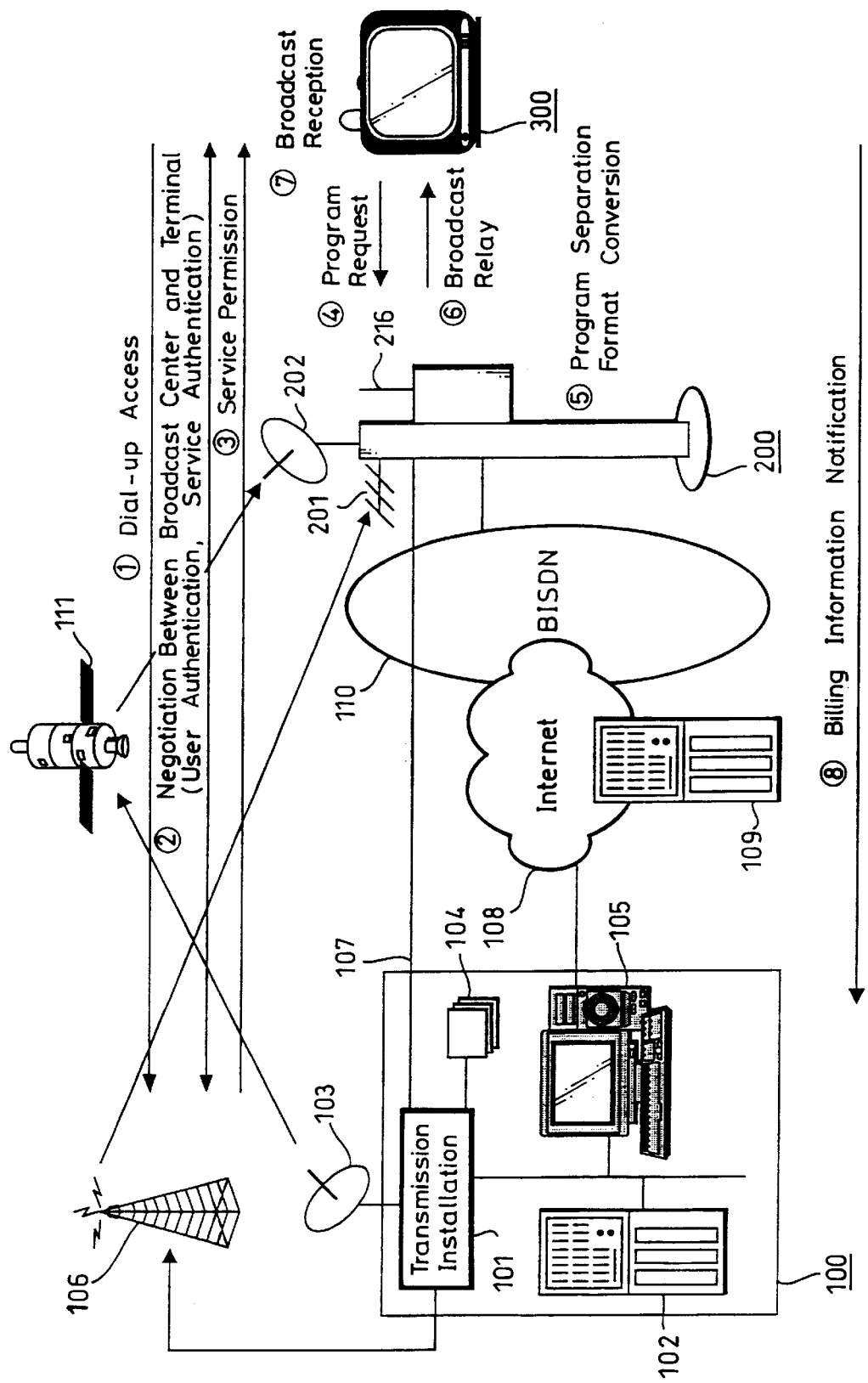
FIG. 6 is a diagram showing an overall system according to a first embodiment of the present invention.

An overall arrangement of a system of this example will be shown in FIG. 6. The system of this example is such that various kinds of broadcasting signals or communication signals transmitted from a broadcasting center 100 or the like are received by a media converting relay station (base station) 200 as a MMAC base station, thereby making it possible for a portable information terminal 300 as a MMAC terminal to receive them.

First of all, an arrangement of the broadcasting center 100 will be explained. Transmission of a broadcasting signal digital television broadcasting signal) from a broadcasting equipment 101 is controlled by a network control equipment 102. In this case, various kinds of broadcasting contents 104 and an access server (or rooter) 105 for an external Internet are provided. Then, a satellite broadcasting signal transmitted from the broadcasting equipment 101 is transmitted by a parabola antenna 103 toward a broadcasting satellite (or communication satellite) 111 for transmission therefrom. Also, a ground wave broadcasting signal transmitted from the broadcasting equipment 101 is transmitted from a ground wave antenna 106. Also, in a case of a cable television broadcast, cable transmission is carried out by using a CATV coaxial cable 107. The access server 105 is connected to an Internet 108 and a relay is carried out by WWW servers 109 which scatteringly exist in the Internet. Meanwhile, video data and audio data transmitted as a ground broadcasting wave, a satellite broadcasting wave and a cable television broadcasting wave are data which is formatted by a so-called MPEG-2 system.

Next, an arrangement of the media conversion base station 200 will be explained. The base station 200 is provided with an antenna 201 for receiving the ground broadcasting wave as well as an antenna 202 for receiving the satellite broadcasting wave, and connected to the CATV coaxial cable 107 and further, connected to a BISDN network 110 through an optical fiber and then connected to the Internet 108 through the BISDN network 110.

Here, an arrangement of the media conversion base station 200 will be explained with reference to FIG. 7. A ground broadcasting wave of a desired channel is received by a tuner 203 connected to the antenna 201 and a signal received is demodulated by a demodulation unit 204 to obtain received data. Also, a satellite broadcasting wave of a desired channel is received by a tuner 205 connected to the antenna 202 and a signal received is demodulated by a demodulation unit 206 to obtain received data. Further, a cable television broadcasting wave of a desired channel is received by a tuner 207 connected to the CATV coaxial cable 107 and a signal received is demodulated by a demodulation unit 208 to obtain received data. Channels received by the respective tuners 203, 205 and 207 are set by control data supplied from a central control unit (CPU) 230 through a bus line 231.

After each of the received data is subjected to a deinterleave process in a deinterleave unit 209, an error correcting process (for example, correction of an outside code by a lead solomon code and demodulation of an inside code by a viterbi decoder) in an error correcting unit 210 and a descramble process in a descramble unit 211, a TS (transport stream) prescribed by a MPEG-2 system is reconstructed.

Here, arrangements of a TS packet and a TS packet stream prescribed by the MPEG-2 system will be shown in FIGS. 9A and 9B. One unit TS packet is, as FIG. 9A shows, made up of 188 bytes, and 4 bytes at the head are a header portion and remaining 184 bytes are a data portion. In the data portion, an area called an adaptation field for transmitting system information such as a data synchronizing reference clock and the like other than data can be provided and properly used dependent on a purpose. There are one byte header synchronizing signal and 13 bits packet identifier (PID) in the header portion. The TS packet stream is such that, as FIG. 9B shows, one transmission frame is made up of 8 TS packets. Meanwhile, generally coded video and audio data are continuous data in terms of time, but they are sectioned at a length convenient for a signal process at a time of being coded as well as for an information display on a receiving side, thereby making up a data grouped signal as a length variable packet after being added with a header. The data grouped signal is dividedly transmitted with (in) TS packets having the same packet identifier.

Figure 7:
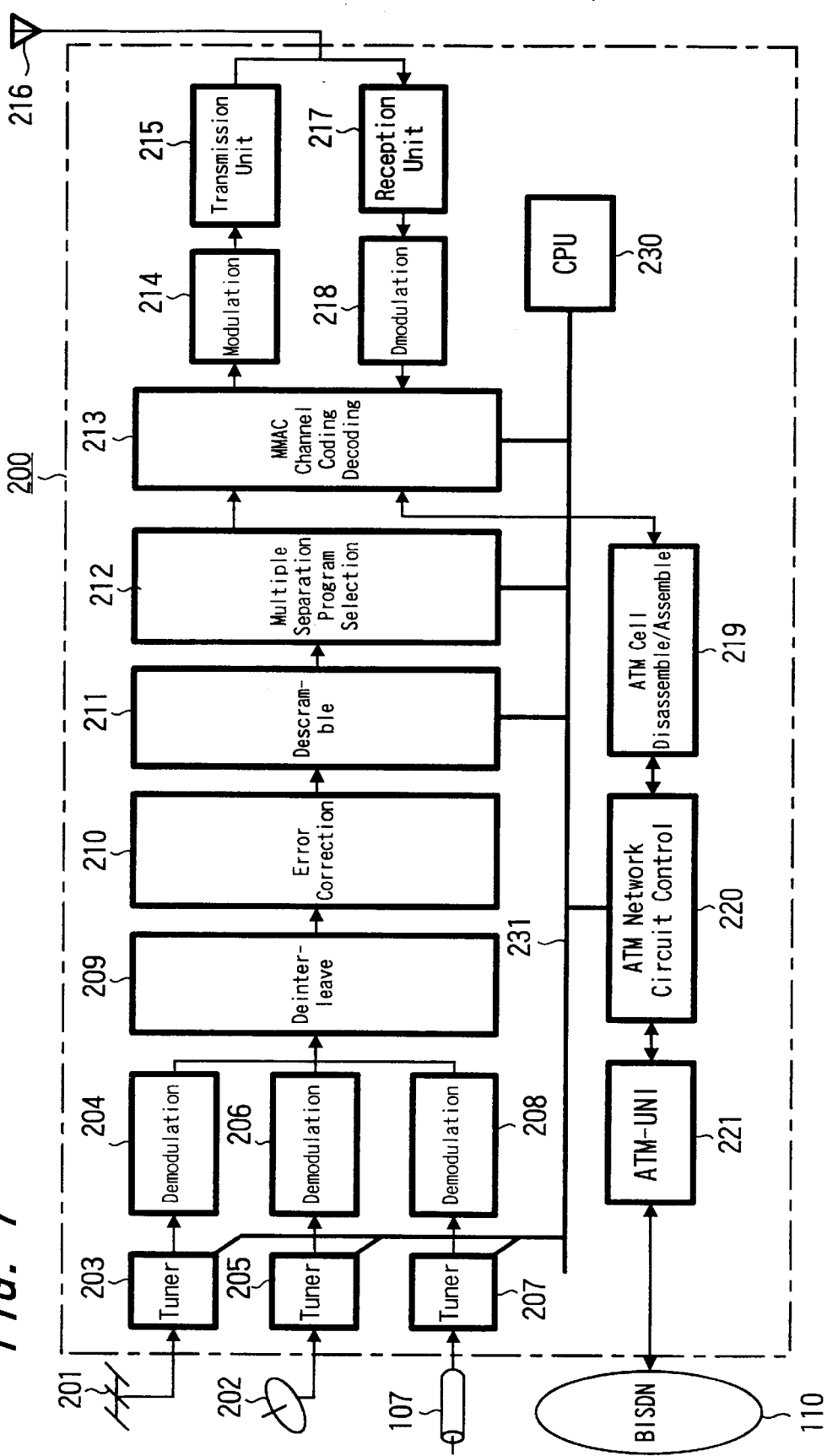
FIG. 7 is a block diagram of a base station according to the first embodiment.

Returning back to an explanation of FIG. 7, a process for selecting and outputting video data and audio data of a desired program from the TS having such an arrangement is carried out in a demultiplexing/program selection unit 212. Here, as for a selection process of the program, for example, by judging a packet identifier added to the TS packet, data of a target program is judged.

Then, the video and audio data outputted from the demultiplexing/program selection unit 212 are supplied to a MMCA channel coding/decoding unit 213 to be converted into a MMCA By radio transmission format, and after this converted data is subjected to a demodulation process by QPSK demodulation in a modulation unit 214, the demodulated data is subjected to a modulation process such as a frequency conversion, an amplification or the like in a transmitting unit 215 and then, radio-transmitted to a terminal from an antenna 216. Meanwhile, a process in the descramble unit 211 and the program selected in the demultiplexing/program selection unit 212 are controlled by the central control unit 230 (CPU). Also, a process in the MMCA channel coding/decoding unit 213 is controlled by the central control unit 230.

Here, the radio transmission format to be converted in the MMCA channel coding/decoding unit 213 will be explained. FIG. 10 is a block diagram showing an example of the MMCA radio transmission format and FIG. 10A shows an arrangement of one frame prescribed by the MMAC format. One frame is made up of 5 msecond and there exist 800 pieces of a slot with 30 bytes therein. Because the MMAC system is so-called Ping-Pong transmission by the TDMA/TDD system, slot 1 through slot 400 in 800 slots are a transmission slot T and slot 401 through slot 800 are a reception slot R. However, there is a case where all of one frame is used only for transmission, and in this case, slot 401 to slot 800 are assigned as the transmission slot T, which makes it possible to carry out one way communication having two times as fast as a transmission speed. Each slot is made up of, as FIG. 10B shows, a header portion (a synchronizing signal, a control signal and the like) with 8 bytes, user data with 20 bytes and a correcting code portion with 2 bytes.

Information volume this arrangement can transmit will be explained. Suppose that the minimum transmission rate of one slot user data is 32 k bits/sec and all of the 800 slots are used, a transmission rate of 32 k×800=25.6 M bits/sec can be attained. In a case of an ordinary communication by the TDMA/TDD system, a transmission rate becomes 12.8M bits/sec, or half of the 25.6M bits.

The video and audio data of a program selected from the TS packet in the demultiplexing/program selection unit 212 are dispersively mapped out in a user data section of each slot in the MMCA channel coding/decoding unit 213 to be transmitted to a terminal side. Generally, an information rate of video data with a quality of a sort of movie film is about 3M bits/sec and it is possible to transmit the video data by assigning thereto about 100 slots in one frame.

Again, returning to an explanation of FIG. 7, a signal transmitted from a terminal side is received by the antenna 216, after being subjected to a receiving process such as a frequency conversion and the like in a receiving unit 217 connected to the antenna 216, is demodulated as the received data in a demodulating unit 218, and the demodulated received data is supplied to the MMCA channel coding/decoding unit 213 to be subjected to a decoding process. Of the decoding processed data, data necessary to be transmitted to the BISDN network 110 is supplied to an ATM cell diassembly/assembly unit 219 to be assembled as an ATM cell for carrying out communication by way of an asynchronous transmission mode (ATM), which is transmitted to the BISDN network 110 from an interface unit 221 under control of an ATM network circuit control unit 220. This transmission control is carried out by the central control unit 230.

Also, of the data transmitted from the terminal side and decoded in the MMCA channel coding/decoding unit 213, a signal for designating a channel as well as a program to be or the like supplied to the central control unit 230 for a judgement, and the central control unit 230 sets channels to be received by respective tuners 203, 205 and 207 and a program to be selected by the demultiplexing/program selection unit 212 or the like to corresponding states.

Also, when a plurality of channels and programs are designated by a transmitted designating signal, if there is a margin in terms of the slot in the MMAC format, the video data, the audio data and so on of a plurality of the designated may be transmitted to the terminal side.

Figure 8:
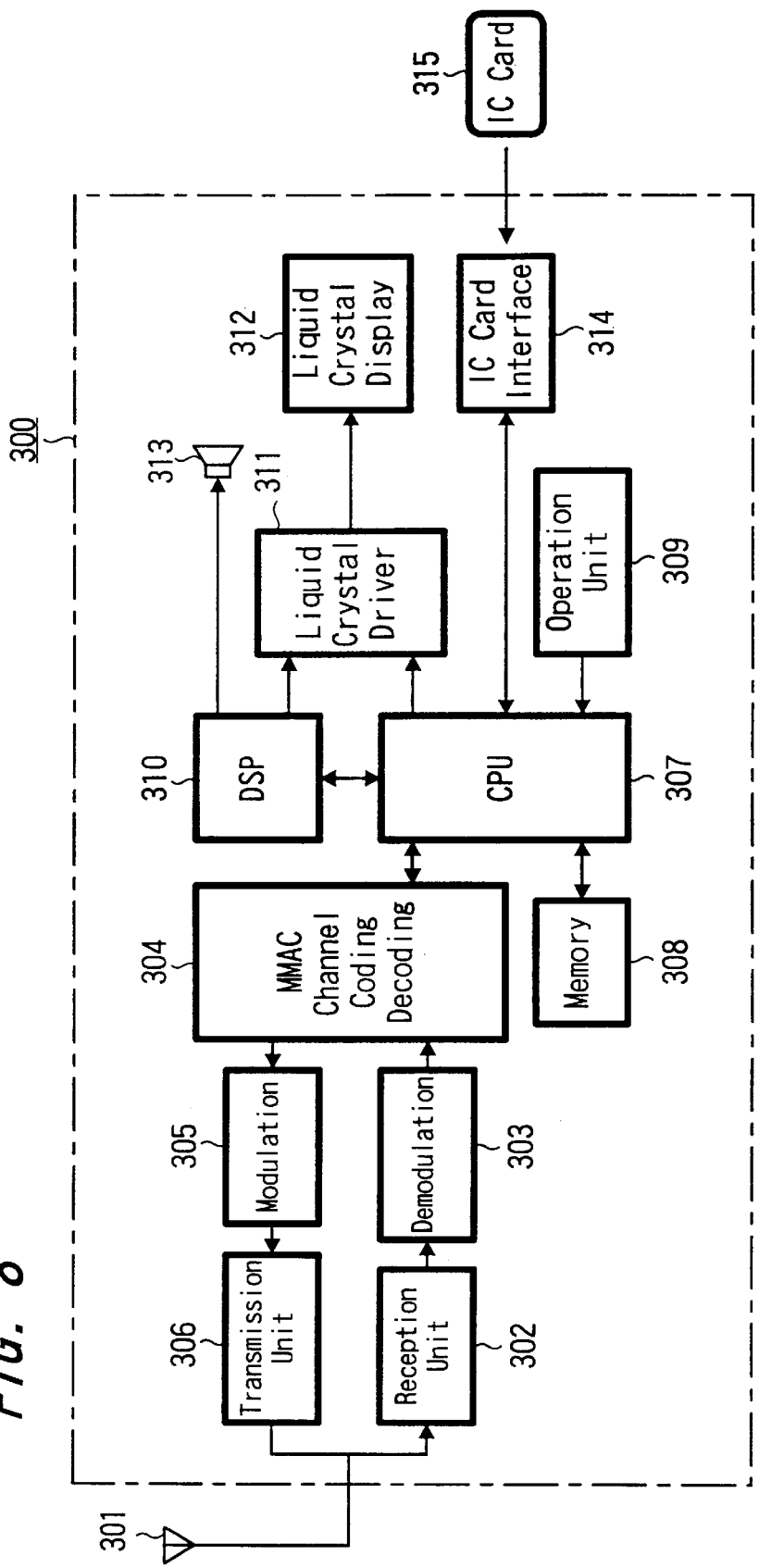
FIG. 8 is a block diagram of a terminal apparatus according to the first embodiment.

Next, an arrangement of the portable information terminal 300 which carries out a radio communication with this base station 200 will be explained with reference to FIG. 8. The portable information terminal 300 is provided with a transmitting/receiving antenna 301, and after a receiving process such as a frequency conversion and the like is carried out by a receiving unit 302 connected to the antenna 301, the received data is demodulated by a demodulation unit 303. The demodulated received data is supplied to a MMCA channel coding/decoding unit 304 and is subjected to a decoding process from the MMAC radio transmission format. This decoded data is supplied to a central control unit (CPU) 307 of the terminal 300 to be subjected to a process of being separated into the video data and the audio data, which are supplied to a digital signal processing unit (DSP) 310 which carries for a decoding process based on the MPEG-2 system. After the video data is processed for a display by the DSP 310, it is supplied to a liquid driver 311. Thus, a liquid display 312 displays a video image based on control by the central control unit 307. Also, the audio data as a digital signal included in the received data is made as an analog audio signal in the digital signal processing unit 310 and then supplied to a speaker 313.

Also, transmission data generated based on an operation of an operation unit 309 connected to the central control unit 307 is supplied to the MMAC channel coding/decoding unit 304 to be converted into the MMAC radio transmission format, and this converted data is subjected to a modulation process by such as the QPSK and the like by a modulation unit 305, and to transmission processes such as a frequency conversion, an amplification and the like by a transmitting unit 306 and then is transmitted toward the base station from the antenna 301. This radio transmission process transmits a designating signal for designating, for example, a channel, a program and the like to be watched to the base station 200. Meanwhile, a memory 308 is connected to the central control unit 307, which is used when there is a need for temporarily memorizing data at a time of a control process.

The portable information terminal 300 in this example is arranged such that an IC card 315 is installed thereto removably, and is provided with an IC card interface unit 314 for outputting and inputting data of this attached IC card 315 and the outputting and inputting data is carried out for the IC card 315 under control of the central control unit 307. In this example, as the IC card 315 to be installed, a card where billing information such as watching and listening history or the like concerning watching of a pay broadcast is stored is used. For example, a history of watching and listening is uploaded from the IC card 315 to a broadcast center side at a monthly unit and the like. In the case of the terminal 300 of this example, when an uploading process of the watching and listening history and an approving process of a pay broadcast based on data memorized by the IC card 315 are carried out, the data for the uploading and approving are transmitted by radio from the terminal 300 to the base station 200 by way of the MMAC radio transmission system and then transmitted by a circuit such as the BISDN network 110 and the like from the base 200 to the broadcasting center 100.

Next, a process at a time of receiving and watching digital television broadcast by the portable information terminal 300 will be explained with reference to FIG. 6. Here, the process is carried out by process procedures (1)–(8) shown in FIG. 6. The procedures are explained in turn:

(1) A radio communication by the MMAC system from the portable information terminal 300 is carried out with the base station 200, and a dial-up access from this base station 200 to the network control apparatus 102 in the broadcasting center 100 is carried out through the BISDN 110 and the Internet 108.

(2) A negotiation for a user authentication and a service authentication is carried out between the network control apparatus 102 and the portable information terminal 300 by the connected circuit.

(3) The base station 200 and the portable information terminal 300 are notified of service permission by the broadcasting center 100 through the connected circuit.

(4) The portable information terminal 300 transmits a signal to the base station 200 for designating a program whose reception is desired.

(5) The base station 200 selects a tuner capable of receiving the designated program, and after separating the program designated by the portable information terminal 300 from a received TS packet, converts it into the MMAC radio format.

(6) The base station 200 carries out an MMAC-system transmission process with a frequency assigned to the base station namely relaying.

(7) The portable information terminal 300 receives the relayed signal and by carrying out the MPEG-2 decoding, receives of broadcasting data.

(8) When there is a need for the billing information such as a pay broadcast and the like, the portable information terminal 300 uploads the billing information to the broadcasting station 100 side by carrying out a periodic MMAC communication and the dial-up access.

Being processed in this manner, it has become possible to easily watch the digital broadcast such as a satellite broadcast and the like with the portable information terminal 300, or the mobile terminal. In this case, the portable information terminal 300 does not need to be provided with a tuner or the like suited for respective broadcasting systems, thereby making it possible to make up a downsized and low cost terminal which is capable of receiving broadcasting signals having a plurality of broadcasting systems.

Meanwhile, when a designated signal demanding reception of a broadcast is transmitted from a portable information terminal (this terminal has fundamentally the same arrangement as that of the terminal 300) other than the terminal 300 within a service area of the base station 200, if the signal is for designating the same program as that which is presently transmitted to the portable information terminal 300, a same communication channel to be transmitted by the MMAC is assigned to other terminals. When the designated program is different, by assigning a different communication channel, data on the program is similarly transmitted as in the above-mentioned (1)–(8) processes.

According to this embodiment, only the program designated from the terminal 300 side is transmitted by the MMAC, but, if the MMAC format to be applied has a margin in terms of a band width, the number of channels and the like, all the TS packet which can be received may be relayed and transmitted to the terminal side. Then, by an operation on the terminal 300 side a desired program is extracted from among transmitted data to be processed for a display and the like. In the case of processing in this manner, it becomes unnecessary to transmit the designated signal for designating a desired program to be received from the portable information terminal 300 to the base station 200 and at the same time, it becomes unnecessary for the base station 200 to carry out a separation process of the program.

Figure 11:
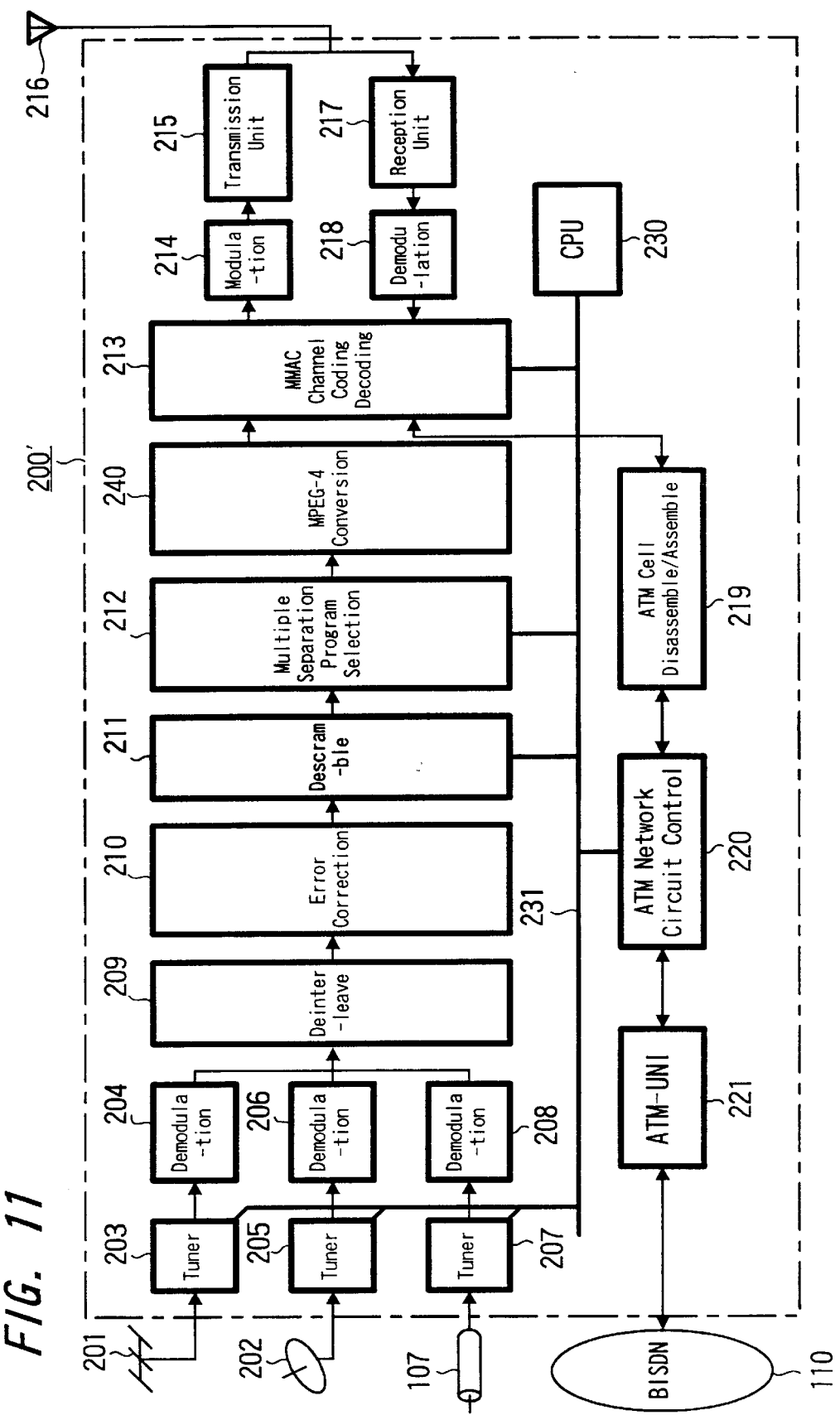
FIG. 11 is a block diagram in a case of carrying out an MPEG-4 conversion in the base station of the first embodiment of the present invention.

Meanwhile, when video data and the like are radio-transmitted between the base station 200 and the portable information terminal 300, the data may be subjected to a compression process so as to be efficiently transmitted. That is, for example, as shown in FIG. 11, a media conversion base station 200' is arranged such that data on a program which is selected from a TS packet with the MPEG-2 system (or all of data included in the TS packet with the MPEG-2 system) in a multiple separation program selection unit 212 is converted and compression-processed in a MPEG-4 conversion unit 240, which carries out a coding process of data to shift to a MPEG-4 system, and the data converted to the MPEG-4 system is coded in a MMAC channel coding/ decoding unit 213. Another arrangement of the media conversion base station 200' is similarly made up as is the media conversion base station 200 shown in FIG. 7.

Then, the portable information terminal 300 is arranged such that received video data and audio data with the MPEG-4 system can be demodulated in a digital signal processing unit or the like. By being arranged like this, it is possible to carry out a low bit rate radio-transmission of, for example, about 64 kbit/sec and as a result, communication resources can be effectively used and it becomes possible to simultaneously transmit a plurality of programs.

Figure 12:
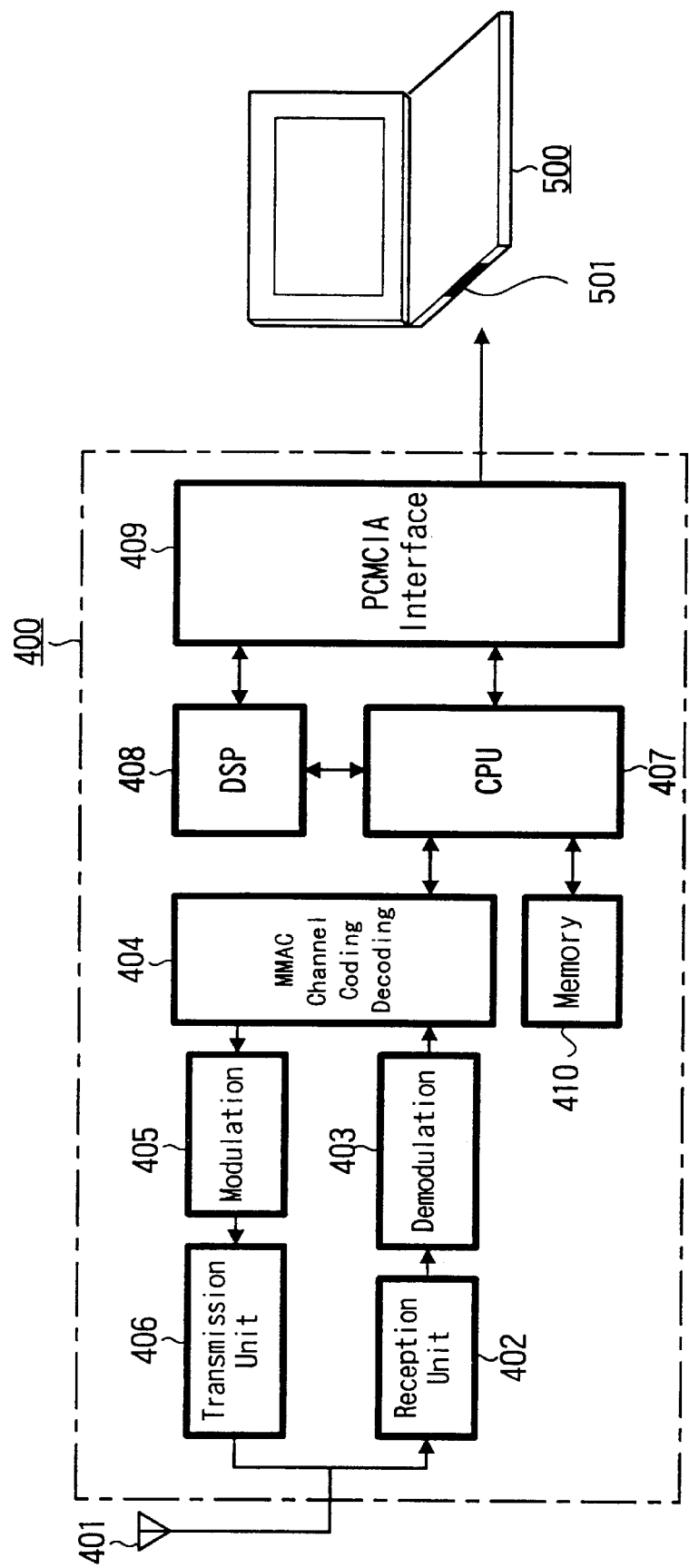
FIG. 12 is a block diagram in a case of constituting a terminal apparatus in the first embodiment of the present invention with a card having a PCMCIA standard.

Also, according to the above-mentioned embodiment, the portable information terminal 300 is made to be able to singly carry out the receiving process, but, it may have an arrangement of another form as a terminal for carrying out a communication with the base station 200 by the MMAC system. For example, as shown in FIG. 12, it may be arranged as a card-type MMAC radio module 400 with a PCMCIA standard. That is, it constitute a MMAC radio module 400 as a card with the PCMCIA standard capable of being installed to a card slot 501 of a note-type personal computer 500. The radio module 400 is provided with a transmitting and receiving antenna 401 (this antenna may well project from the card), and after carrying out a receiving process such as a frequency conversion and the like in a receiving unit 402 connected to the antenna 401, received data is demodulated in a demodulation unit 403 and the demodulated received data is supplied to a MMAC channel coding/decoding unit 404 for carrying out a converting process from a MMAC radio transmission format. This converted data is supplied to a central control unit (CPU) 407 of the MMAC radio module 400 and separated to video data and audio data, which are supplied to a digital signal processing unit (DSP) 408 to be subjected to a decoding process based on the MPEG-2 system or the like and the decoded video data and audio data are outputted from a PCMCIA interface unit 409.

Also, transmission data generated based on the data supplied to the PCMCIA interface unit 409 is supplied to the MMAC channel coding/decoding unit 404 to be converted into the MMAC radio transmission format, and after this converted data is modulation-processed by way of the QPSK in a modulation unit 405, receiving processes such as a frequency conversion, an amplification and the like are carried out in a transmitting unit 406 for radio transmission from the antenna 401 to the base station. Meanwhile, a memory 410 is connected to the central control unit 407, and when there is a need for temporary memorization of the data at a time of control-processing, this memory 410 is used.

With the card being so arranged as to be connected to a computer apparatus, various kinds of portable equipment and the like, it becomes possible to receive and watch a desired program with the equipment installed with this card 400.

Figure 13:
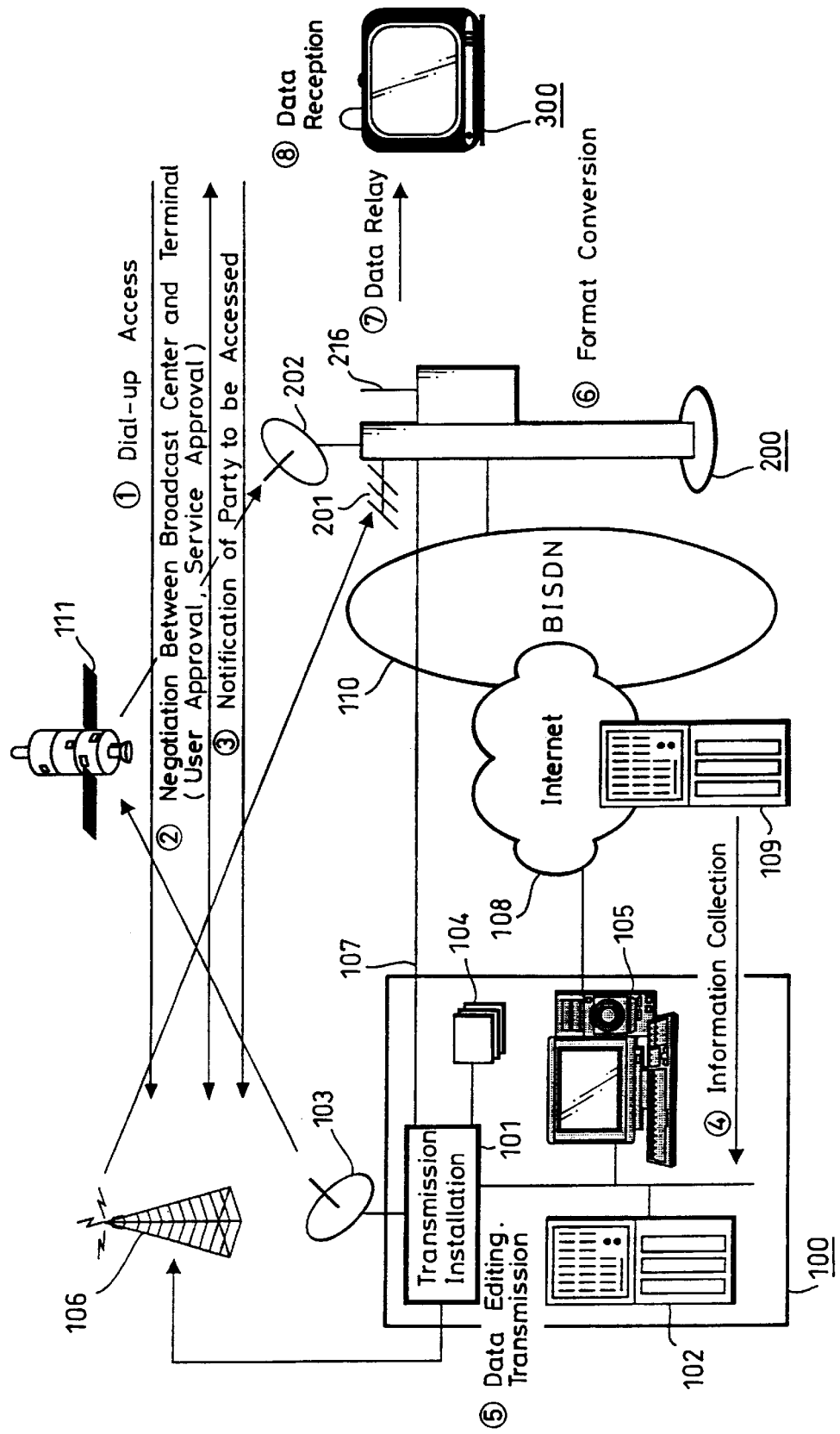
FIG. 13 is a diagram showing an overall system according to a second embodiment of the present invention.

Next, a second embodiment of the present invention will be explained with reference to FIG. 13. In FIG. 13, portions corresponding to FIG. 6 through FIG. 12 of the above-mentioned first embodiment will be attached with the same reference numerals and so, the detailed explanation thereof will be omitted.

In this example, as in the case of the first embodiment, in a multimedia mobile access system (hereafter, is called a MMAC), various kinds of broadcasting signals and communication signals are handled and an overall arrangement of the system will be shown in FIG. 13. In this example, an arrangement of the broadcasting center 100, the media conversion base station (relay station) 200 and the portable information terminal 300 is the same as in the first embodiment, and the format of a transmitted signal is the same as that of the first embodiment and here, an explanation thereof will be omitted.

Then, this example is arranged such that the broadcasting center 100 transmits, on demand by a user, an Internet broadcast and information such as various kinds of contents or the like by using a vacant band (or an band specifically prepared for an exclusive use) in a circuit prepared for transmitting a broadcasting signal. Here, in this example, a desired Internet broadcast or the like is transmitted on the demand by the portable information terminal 300 and the terminal 300 is made to receive the same.

Hereafter, a process for transmitting desired contents of the Internet will be explained with reference to FIG. 13. Here, the process is carried out according to process procedures of (1) to (8) shown in FIG. 13. When the procedures are explained in order:

(1) The portable information terminal 300 carries out a radio communication with the base station 200 by way of the MMAC system, and a dial-up access is carried out to the network control apparatus 102 in the broadcasting center 100 from the base station 200 through the BISDN network 110 and the Internet 108.

(2) Through the connected circuit, a negotiation is carried out between the network control apparatus 102 and the portable information terminal 300 for a user-authentication and a service authentication.

(3) The network apparatus 102 is notified of a URL the portable information terminal 300 accesses over the connected circuit.

(4) The network control apparatus 102 collects information from a designated WWW server 109 in the Internet 108 through the access server 105.

(5) The network control apparatus 102 edits collected data into the MPEG-2 TS packet, which is transmitted through the satellite wave, the ground wave or the cable from the transmission facility 101.

(6) The base station 200 carries out a receiving process of the transmitted signal from the broadcasting center 100 for data demodulation and converts the decoded TS packet into the MMAC radio format.

(7) The converted signal is subjected to a MMAC transmission process with a frequency assigned to the base station by the base station 200 and is relayed.

(8) The portable information terminal 300 receives the relayed signal, carries out the MPEG-2 decoding of it and carries out a receiving process of Internet data.

By being processed in this manner, when Internet information is transmitted together with a broadcasting signal, that information can be received by the portable terminal. In this case, the portable information terminal 300 does not have to be provided with a processing unit such as a tuner and the like suited for respective broadcasting systems, with a result that a terminal capable of receiving Internet data transmitted by a broadcasting signal can be made up downsizedly and at low cost. Also, because it is possible to easily receive the Internet information transmitted by the broadcasting signal or the like, the Internet information can be easily received by a mobile terminal, a load on the Internet server can be reduced, a large amount of transmission becomes possible, thereby leading to reduction in communication cost without using a ground-system public network.

Meanwhile, in each of the above-mentioned embodiments, explanations have been made as to the process in the case where coded data by a coding system called the MPEG-2 system is transmitted, but the process of the present invention can be applied to a case where coded data by other coding system is transmitted. Also, in each of the above-mentioned embodiments, the broadcasting signal transmitted from the broadcasting center side is received and relayed by the base station, but the base station may receive a communication signal transmitted from some communication center sides and relay it to a radio terminal.

Also, in the above-mentioned embodiment, the MMAC system is applied to the radio communication between the base station and the terminal apparatus, but, as a matter of course, other radio transmission processing system may be applied.

According to the present invention, it is possible to select the communication signals which the relaying station can receive or an arbitrary signal out of the broadcasting signals and transmit it to the communication terminal side, and the broadcasting signal or the communication signal transmitted in various kinds of formats can be received by one unit of communication terminal.

According to the present invention, designation of the signal to be received and demodulated is carried out by the communication terminal, and by radio-transmitting the data designated by the communication terminal to the relaying station, selection of the signal to be received by the communication terminal side becomes possible.

According to the present invention, with the demodulated received data being coded by a method different from an original data coding method and then converted into the predetermined radio transmission format for radio transmission, the communication terminal side can carry out a common receiving process without being provided with receiving processing units corresponding to the respective radio transmission formats.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A communication system comprising:

relay means including:

first receiving means having a plurality of receivers for receiving simultaneously a plurality of communication signals in data packet form transmitted by a plurality of different transmission systems including a satellite transmission system, a ground antenna transmission system, and a cable transmission system, control means for selecting one of said plurality of receivers in response to a request signal, selecting means for selecting, in response to said request signal, a desired program from one of said plurality of communication signals received by said selected one of said plurality of receivers, converting means for mapping said desired program selected by said selecting means into a plurality of slots to form a radio signal corresponding to a specific radio transmission format, wherein said radio signal includes an Internet broadcast and content information, and radio transmission means for transmitting said radio signal using a vacant band; and terminal means including:

second receiving means for receiving said radio signal corresponding to said specific radio transmission format, and request signal generating means for generating said request signal and request signal transmission means for transmitting said request signal to said relay means.

2. The communication system as set forth in claim 1, wherein said terminal means is formed of a terminal apparatus body and a card detachable from said terminal apparatus body, and said request signal transmission means and said second receiving means are provided on said card.

3. The communication system as set forth in claim 1, wherein said one of said plurality of communication signals received by one of said first and second receiving means is coded data coded by a first format, said relay means includes coding means for coding said coded data by a second format different from said first format, and said converting means converts an output signal from said coding means into a radio signal corresponding to said specific radio transmission format.

4. A relay apparatus in a communication system comprising:

receiving means including a plurality of receivers for receiving simultaneously a plurality of communication signals in data packet form transmitted by a plurality of different transmission systems including a satellite transmission system, a ground antenna transmission system, and a cable transmission system;

control means for selecting one of said plurality of receivers in response to a request signal;

selecting means for selecting, in response to said request signal, a desired program from one of said plurality of communication signals received by said selected one of said plurality of receivers;

converting means for mapping said desired program selected by said selecting means into a plurality of slots to form a radio signal corresponding to a specific radio transmission format, wherein said radio signal includes an Internet broadcast and content information; and radio transmission means for transmitting said radio signal using a vacant band to terminal means using said specific radio transmission format, wherein said request signal is transmitted by said terminal means using said specific radio transmission format.

5. The relay apparatus as set forth in claim 4, wherein said one of said plurality of communication signals received by said receiving means is coded data coded by a first format.

6. The relay apparatus as set forth in claim 5, further comprising:

coding means for coding said coded data by a second format different from said first format, wherein said converting means converts an output signal of said coding means into said radio signal corresponding to said specific radio transmission format.

* * * * *